(12) United States Patent
Martini Bernardi et al.

(10) Patent No.: US 6,331,643 B1
(45) Date of Patent: Dec. 18, 2001

(54) METHOD FOR PRESERVATION OF OLIVE OIL

(75) Inventors: Neri Martini Bernardi; Sebastiano Martini Bernardi; Niccoló Martini Bernardi Colantoni, all of Florence (IT)

(73) Assignee: Vivo S.r.l., Florence (IT)

( * ) Notice: Subject to any disclaimer, the term of this patent is extended or adjusted under 35 U.S.C. 154(b) by 0 days.

(21) Appl. No.: 09/322,992

(22) Filed: Jun. 1, 1999

(30) Foreign Application Priority Data

Jul. 21, 1998 (IT) .............................. MI98A1677
Apr. 13, 1999 (IT) ............................ MI99A0755

(51) Int. Cl.$^7$ .................................. C07C 51/50
(52) U.S. Cl. ................................ 554/7; 554/2
(58) Field of Search ............................. 554/2, 7

(56) References Cited

FOREIGN PATENT DOCUMENTS 207551    5/1925   (GB) .

OTHER PUBLICATIONS

A. Kaya, et al., Lebensmittel Wissenshcaft und Technologie, vol. 26, No. 5, pps. 464–468, "Oxidative Stability of Sunflower and Olive Oils: Comparison Between a Modified Active Oxygen Method and Long Term Storage," 1993.

A. De Leonardis, et al., La Rivista Italiana Delle Sostanze Grasse, vol. 75, No. 8/9, pps. 391–397, "Evaluation of the Shelf–Life of Virgin Olive Oil," 1998.

*Primary Examiner*—Deborah D. Carr
(74) *Attorney, Agent, or Firm*—Oblon, Spivak, McClelland, Maier & Neustadt, P.C.

(57) ABSTRACT

A method is described for preservation of olive oil, and preferably extra-virgin olive oil, which discloses freezing or deep-freezing of the olive oil, as soon as it has been pressed, or within three months after being pressed, at a temperature of between –40° C. and 0° C., for a period of up to three years. Furthermore, a method which discloses also, before freezing or deep-freezing, the filtering of olive oil is described. This method has the advantage that it keeps the organoleptic and chemical-physical qualities of the product almost unchanged, for periods which are far longer than those which are permitted by the present preservation techniques.

10 Claims, 7 Drawing Sheets

METHOD FOR PRESERVATION OF OLIVE OIL

Figure 1:
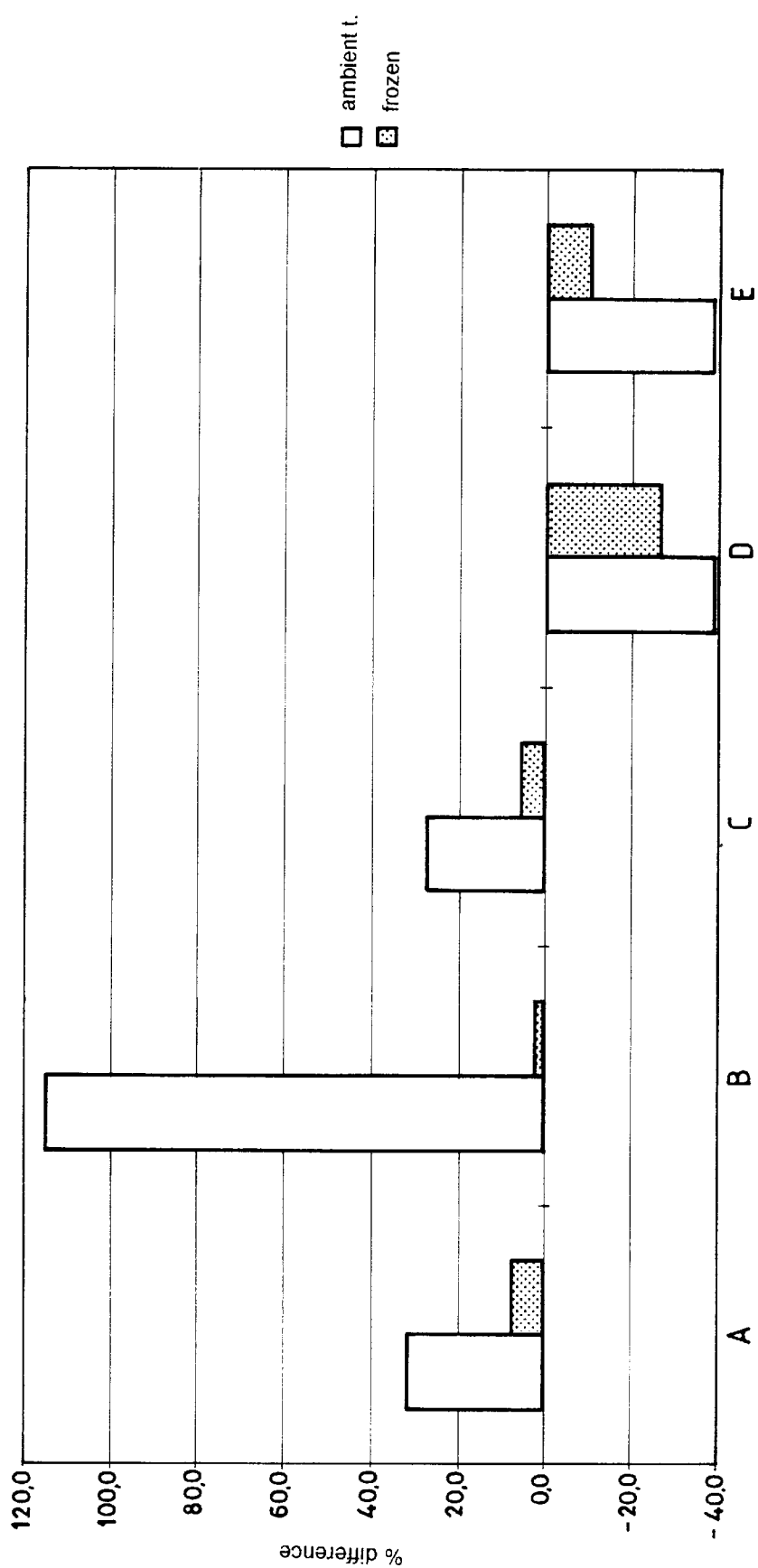

The present invention relates to a method for preservation of olive oil, in particular extra-virgin olive oil.

Olive oil is a product which has extremely complex organoleptic and chemical-physical characteristics. Simultaneous preservation of all these characteristics is essential in order for the product to have the specific taste, odour, and nutritive properties etc, which make it an extremely important component in a correct, balanced diet.

The preservation of olive oil in general, and extra-virgin olive oil in particular, is thus a very important process. At present it is carried out in steel containers, which are protected against light, at ambient temperature. In these conditions, in general the olive oil is characterised by a life which is not very long, and not longer than eighteen months.

As shown in the subsequent table 1, its chemical-physical characteristics already deteriorate substantially after six months' preservation at ambient temperature, in optimum conditions. For example, processes of oxidation of the fatty acids begin, which consequently make the product rancid.

These periods are incompatible with the present needs for the life of a product.

In fact since olive oil, and in particular extra-virgin olive oil, is a product which has a high production cost, it is very important to succeed in preserving it for as long as possible. In fact, a long life makes the production of olive oil, and in particular extra-virgin olive oil, more convenient and competitive, and for example allows it to be sold in distant countries, and to remain on sale for longer periods of time, before it has to be withdrawn because it is close to its "best before" date.

The method which is the subject of the present invention makes it possible to eliminate the disadvantages of the known art.

In particular, the subject of the present invention is a method for preservation of olive oil, preferably extra-virgin olive oil, characterised in that it comprises freezing or deep-freezing of the olive oil, as soon as it has been pressed, or within three months after being pressed, at a temperature of between −40° C., and 0° C., for a period of up to three years.

A further object of the present invention is a method for preservation of olive oil, preferably extra-virgin olive oil, characterised in that it comprises freezing or deep-freezing of the olive oil, as soon as it has been pressed, or within three months after being pressed, at a temperature of between −40° C. and 0° C., for a period of up to three years, said method being further characterised in that, before freezing or deep-freezing, the olive oil is filtered.

The method according to the present invention preferably comprises freezing or deep-freezing of olive oil at a temperature of between −20° C. and −10° C.

In the method according to the present invention, the filtering step can be carried out through any of the filtering techniques known to a person skilled in the art and, in particular, through percolation on cotton or with cardboard filters.

The method of preservation according to the present invention can be applied also to optionally flavoured olive oil, in particular extra-virgin olive oil.

A further object of the present invention is frozen or deep-frozen olive oil, in particular extra-virgin olive oil, according to the method of the present invention.

This method has the main advantage that it keeps the organoleptic and chemical-physical qualities of the product almost unchanged, for periods which are far longer than those which are permitted by the present preservation techniques.

In particular, the filtering step, carried out before submitting the product to freezing or to deep-freezing, allows the suspended particles to be filtered, thus avoiding the formation of deposits, removing water and mucilage.

Such step allows to obtain an improved preservation of the product during the freezing or deep-freezing and mainly after the thawing step.

The basic advantage of the method according to the present invention thus consists of providing a longer life of the product, as well as keeping virtually unchanged, or giving rise to extremely limited variation of, all the chemical-physical and organoleptic characteristics of the product which has just been pressed.

The characteristics and advantages of the method according to the present invention will become more apparent from the following detailed description, which is provided by way of example.

An extra-virgin olive oil produced on Nov. 28th 1997 was subjected to chemical analysis the day after it was pressed, and the following parameters were analysed: acidity, number of peroxides, ultra-violet spectrophotometry, polyphenols and vitamin E (see table 1).

Six parts of the sample were then placed in a freezer at a temperature of −14° C., in polyethylene containers; another part was preserved at ambient temperature, in the dark, in a steel container. Two parts more were filtered and then immediately placed in a freezer at a temperature of −14° C., in polyethylene containers.

The same analytical determinations were then repeated after a period of time of three and six months, on the non-filtered sample taken from the freezer, on the filtered sample taken from the freezer and on the sample preserved at ambient temperature, in order to evaluate the differences of chemical behaviour; the results are given in the following table 1.

TABLE 1

| Determination | Untreated oil | After 3 months at ambient T | Non-filtered, after 3 months in freezer | Filtered, after 3 months in freezer | After 6 months at ambient T | Non-filtered, after 6 months in freezer | Filtered, after 6 months in freezer |
| --- | --- | --- | --- | --- | --- | --- | --- |
| Acidity (% oleic acid) | 0.41 | 0.47 | 0.42 | 0.41 | 0.54 | 0.44 | 0.42 |
| No. of peroxides ($meqO_2$/kg) | 6.3 | 9.4 | 6.7 | 6.7 | 13.0 | 6.9 | 6.9 |
| K32 | 1.712 | 2.149 | 1.752 | 1.754 | 2.183 | 1.806 | 1.808 |

TABLE 1-continued

| Determination | Untreated oil | After 3 months at ambient T | Non-filtered, after 3 months in freezer | Filtered, after 3 months in freezer | After 6 months at ambient T | Non-filtered, after 6 months in freezer | Filtered, after 6 months in freezer |
|---|---|---|---|---|---|---|---|
| K270 | 0.118 | 0.148 | 0.139 | 0.141 | 0.152 | 0.145 | 0.147 |
| Polyphenols (ppm) | 258 | 184 | 211 | 215 | 156 | 189 | 197 |
| Vitamin E (ppm) | 135 | 102 | 130 | 129 | 82 | 121 | 118 |

In the tests shown in Table 1, the acidity was measured by means of acidimetry, and the number of peroxides was measured by means of iodometry.

These values show that the oil preserved in the freezer, filtered or non-filtered, has chemical-physical characteristics which are very close to those of the oil just obtained from the mill, whereas the chemical-physical characteristics of the sample of oil preserved at ambient temperature, for the same period of time, have clearly deteriorated.

In fact, the values given in the table show very clearly that the oil preserved in the freezer has a better state of preservation, and lesser chemical-physical deterioration.

In fact, the acidity values and the number of peroxides are slightly higher than the initial value (after six months the oil preserved in the freezer has a number of peroxides equivalent to 6.9, compared with the value of 6.3 for the oil obtained from the mill, whereas the oil preserved at ambient temperature has a value of 13).

This shows clearly that there is greater resistance to the start of the processes of oxidation of the fatty acids, with consequent greater stability, as far as the fats becoming rancid is concerned.

The graph in FIG. 1 shows the percentage differences between the various parameters of the olive oil preserved at ambient temperature and the deep-frozen olive oil, after six months: A) represents the acidity; B) is the number of peroxides; C) is the spectrophotometric data; D) is the variation of the content of polyphenols; and E) is the variation of the content of vitamin E.

It can be seen immediately that the deep-frozen oil has greater spectrophotometric stability, and a 10% reduction of the vitamin E, compared with a 40% reduction of the vitamin E which can be noted for the sample of oil preserved at ambient temperature.

Figure 2:
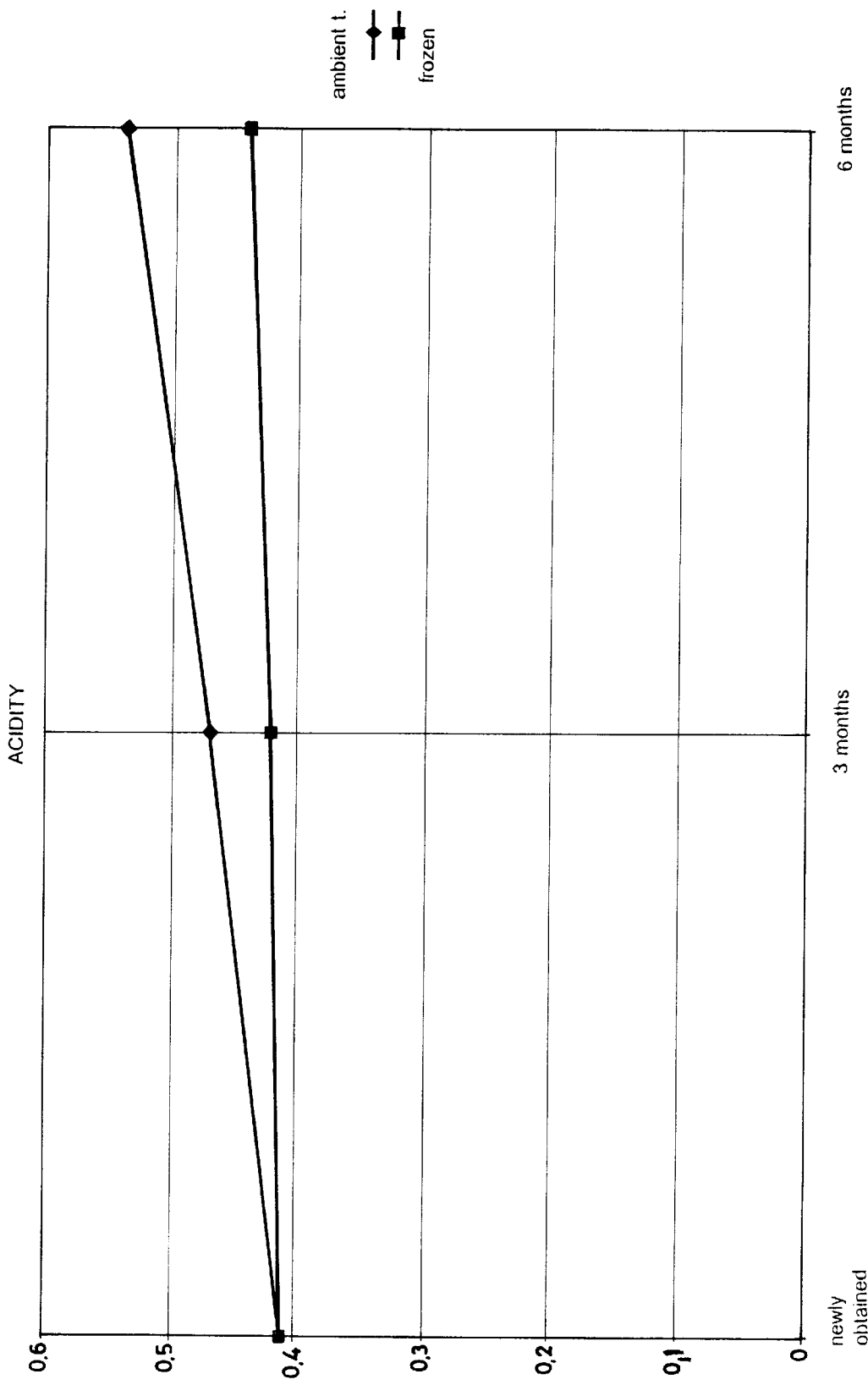
Figure 3:
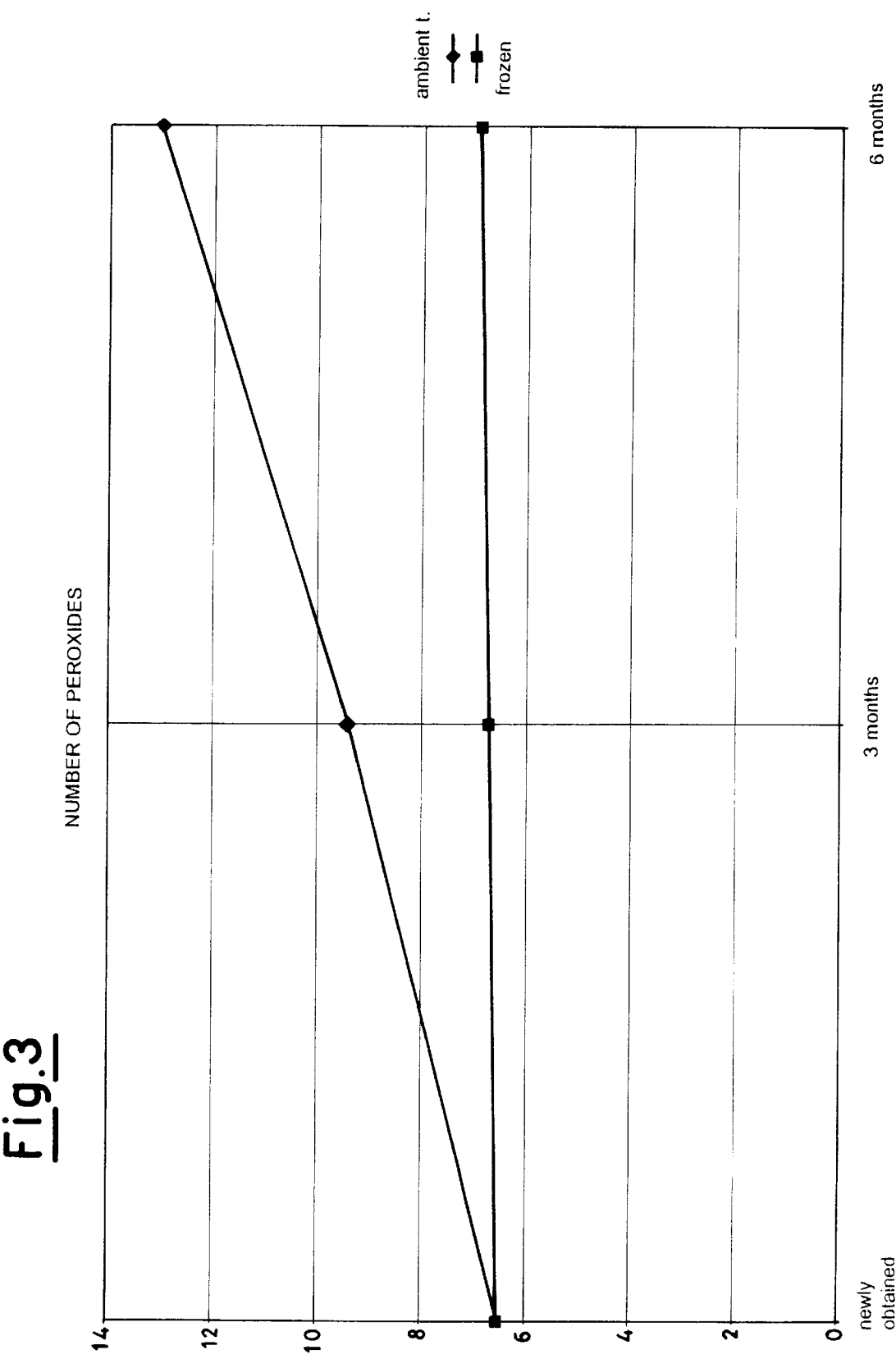
Figure 4:
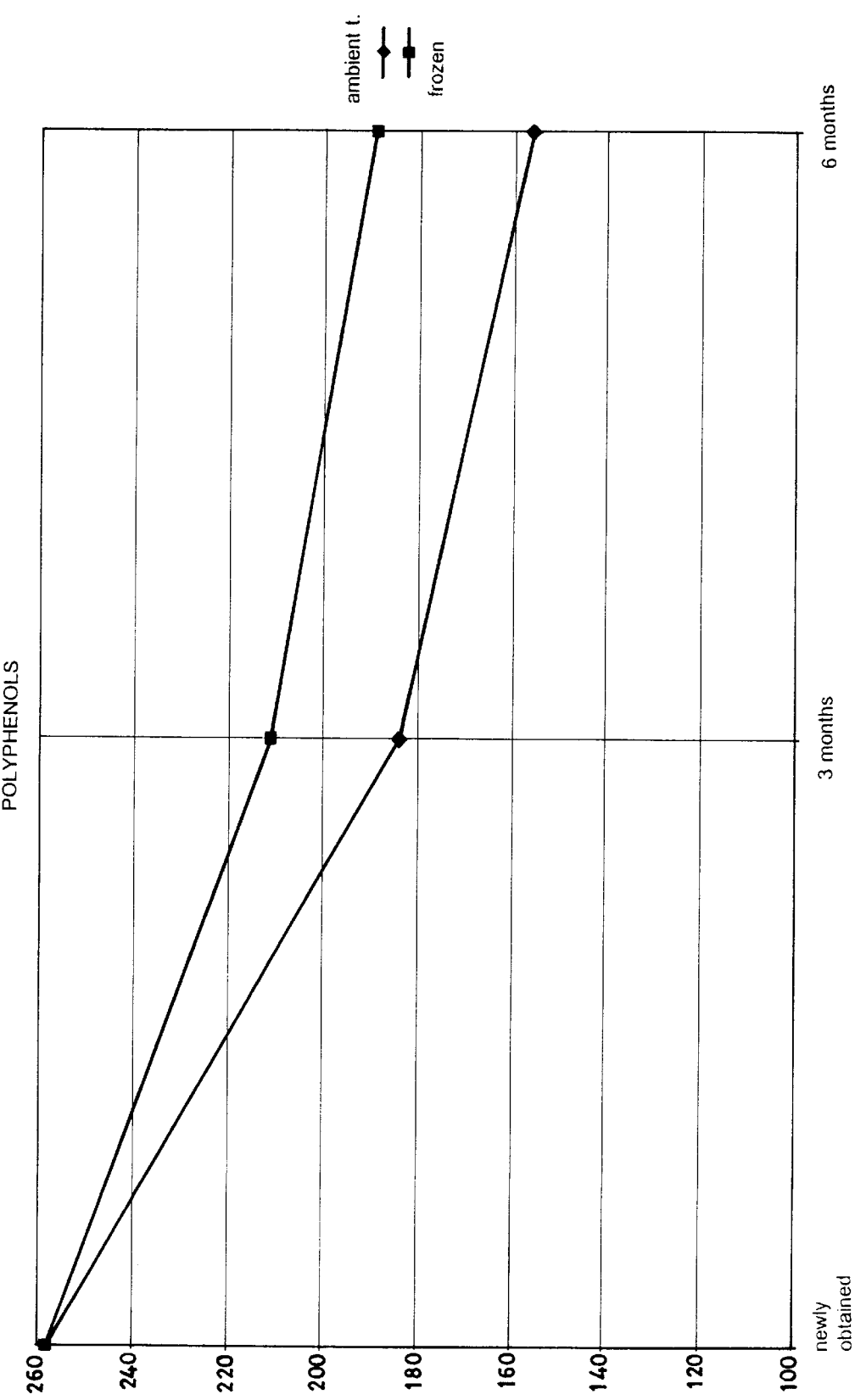
Figure 5:
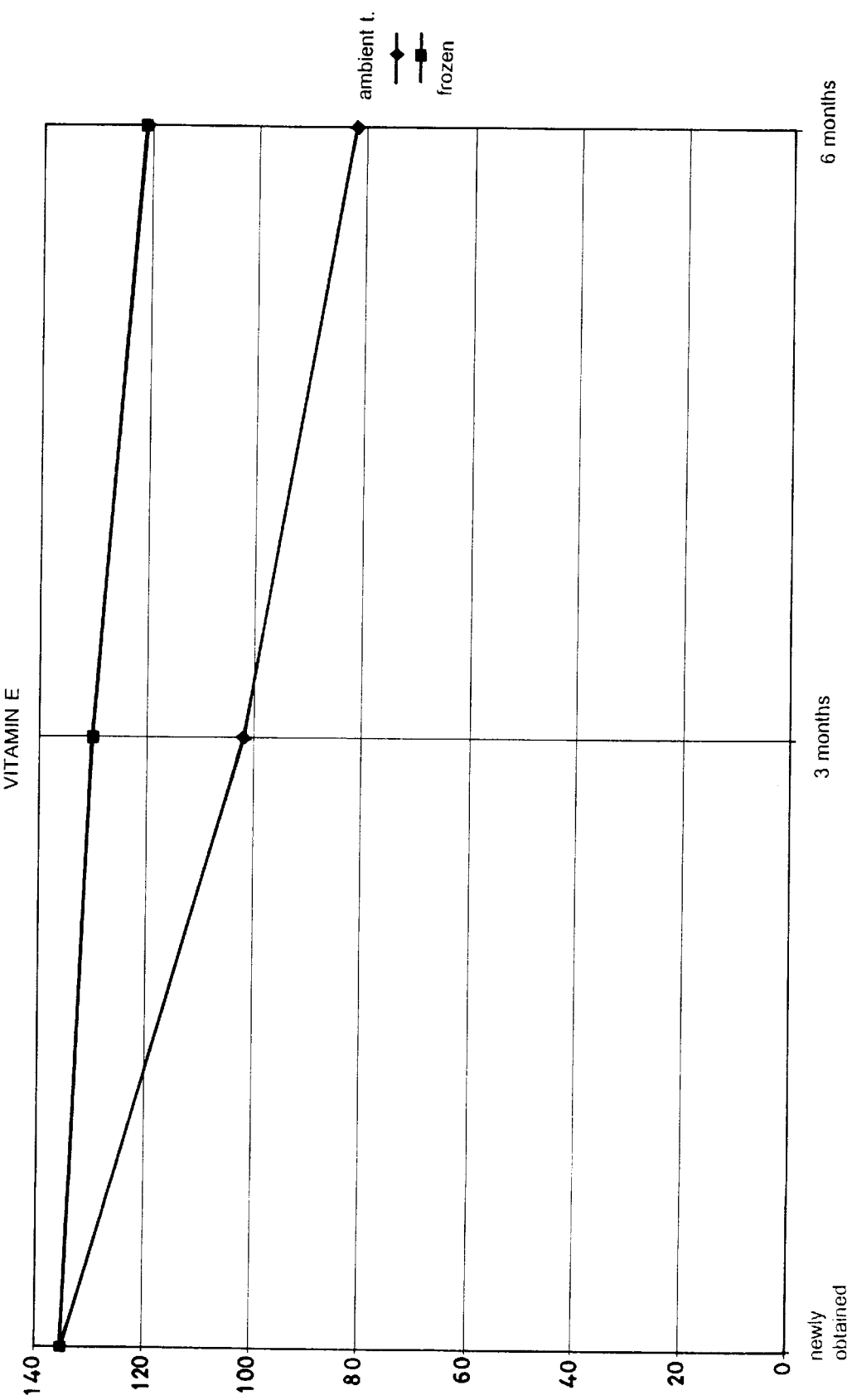
Figure 6:
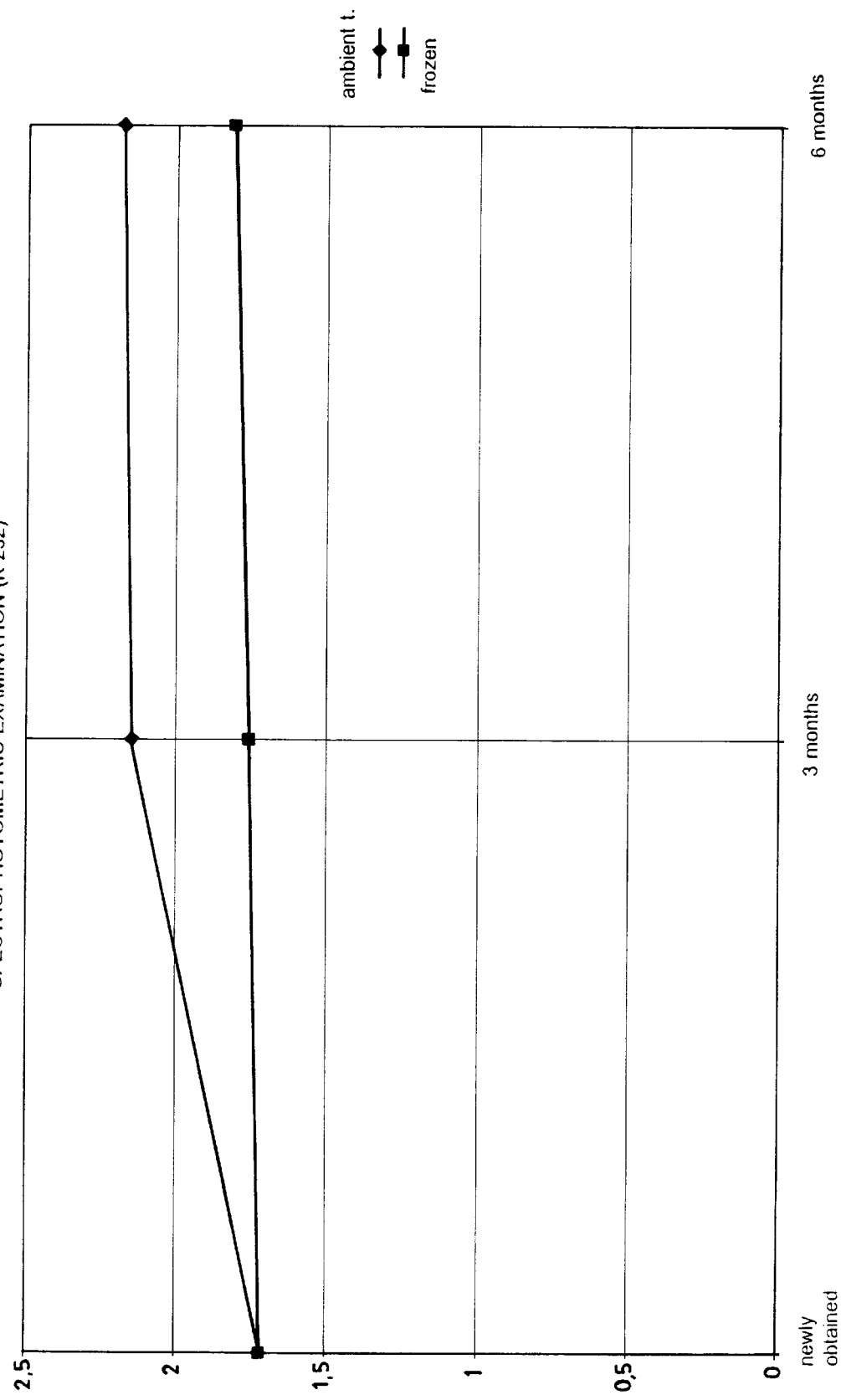
Figure 7:
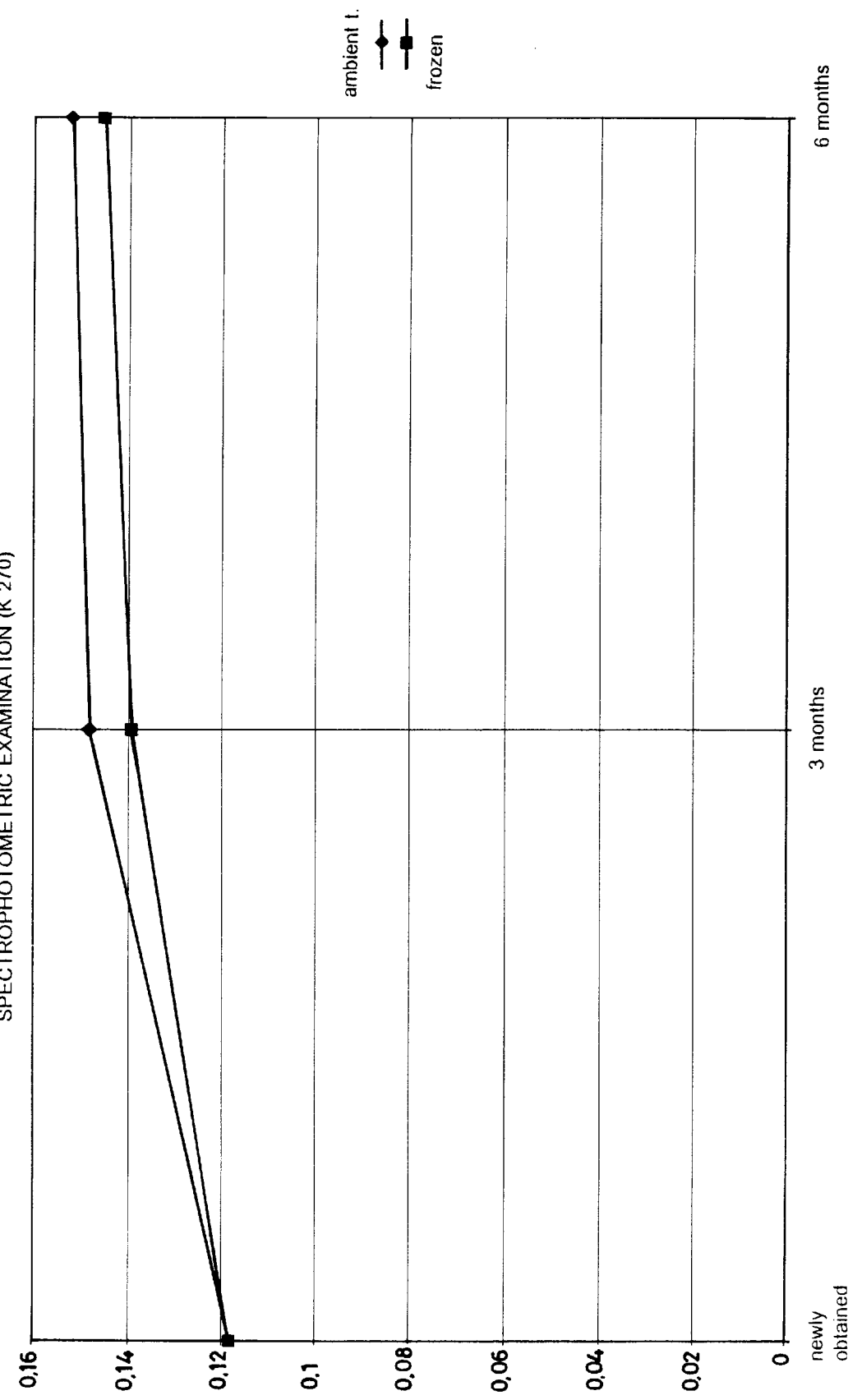

FIG. 2 consists of a graph which shows the variation over a period of time in the acidity values for the deep-frozen sample and for the sample preserved at ambient temperature; FIG. 3 is a graph which shows the variation over a period of time in the number of peroxides, for the deep-frozen sample and for the sample preserved at ambient temperature; FIG. 4 is a graph which shows the variation over a period of time in the polyphenols, for the deep-frozen sample and for the sample preserved at ambient temperature; FIG. 5 is a graph which shows the variation over a period of time in the quantity of vitamin E, for the deep-frozen sample and for the sample preserved at ambient temperature; FIG. 6 shows the spectrophotometric examination (K232) for the deep-frozen sample and for the sample preserved at ambient temperature; and FIG. 7 shows the spectrophotometric examination (K270) for the deep-frozen sample and for the sample preserved at ambient temperature.

In the light of the tests and the data previously recorded, it can be seen that preservation of olive oil by means of deep-freezing is a method for preservation of this product which keeps its organoleptic characteristics and the basic analytical parameters virtually unchanged.

When the method of preservation of olive oil according to the present invention discloses that olive oil is filtered, as soon as it has been pressed and before freezing or deep-freezing, the product obtained after the preservation and the thawing presents virtually unchanged chemical-physical and organoleptic characteristics, with respect to the characteristics of the product which has just been pressed, with also a further advantage with respect to the non-filtered frozen or deep-frozen product: deposits and suspensions are drastically decreased. In fact, the suspended particles are removed, mostly avoiding the formation of deposits, eliminating water and mucilage.

Such step allows an improved preservation during the freezing or deep-freezing time and mainly after the thawing step.

The basic advantage of the method according to the present invention thus consists of providing a longer life of the product, as well as keeping virtually unchanged, or giving rise to extremely limited variation of, all the chemical-physical and organoleptic characteristics of the product which has just been pressed. A further advantage of the method of preservation according to the present invention is that it makes it possible to avoid depositing of suspensions.

What is claimed is:

1. Method for preservation of olive oil, characterised in that it comprises freezing or deep-freezing of the oil, as soon as it has been pressed, at a temperature of between −40° C. and 0° C., for a period of up to three years.

2. Method for preservation of olive oil, characterised in that it comprises freezing or deep-freezing of the oil, as soon as it has been pressed, at a temperature of between −40° C. and 0° C., for a period of up to three years, said method being further characterised in that, before freezing or deep-freezing, olive oil is filtered.

3. Method according to claims 1 or 2, characterised in that the freezing or deep-freezing is carried out at a temperature of between −20° C. and −10° C.

4. Method according to claims 1 or 2, characterised in that the olive oil is extra-virgin olive oil.

5. Method according to claims 1 or 2, characterised in that the olive oil is flavoured.

6. Method according to claims 1 or 2, characterised in that the freezing or deep-freezing of the oil is carried out at a temperature of −14° C.

7. Method according to claim 1, characterised in that the filtering step is carried out through percolation on cotton.

8. Method according to claim 1, characterised in that the filtering step is carried out on cardboard filters.

9. Olive oil preserved by means of the method according to claims 1 or 2.

10. Extra-virgin olive oil preserved by means of the method according to claims 1 or 2.

* * * * *